United States Patent
Pattok et al.

(10) Patent No.: US 6,920,804 B2
(45) Date of Patent: Jul. 26, 2005

(54) STAKED RETENTION FOR PINION BALL BEARING

(75) Inventors: Eric D. Pattok, Saginaw, MI (US);
Donald J. Smith, Saginaw, MI (US);
Rolf E. Kleinau, Bay City, MI (US);
William S. Anders, Merrill, MI (US);
Ryan J. Pavlawk, Munger, MI (US);
Terrance R. Bauer, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 70 days.

(21) Appl. No.: 10/191,008

(22) Filed: Jul. 8, 2002

(65) Prior Publication Data

US 2003/0221500 A1 Dec. 4, 2003

Related U.S. Application Data (60) Provisional application No. 60/383,550, filed on May 28, 2002.

(51) Int. Cl.[7] .............................................. F16H 35/00
(52) U.S. Cl. ........................ 74/388 PS; 74/29; 74/422; 384/559; 384/585
(58) Field of Search ................... 74/388 PS, 29, 74/422; 384/537, 544, 559, 584, 585

(56) References Cited

U.S. PATENT DOCUMENTS

| | | | | |
|---|---|---|---|---|
| 4,809,806 A | * | 3/1989 | Pietrzak et al. | 180/428 |
| 4,890,683 A | * | 1/1990 | Matsuda et al. | 180/444 |
| 5,061,090 A | * | 10/1991 | Kriaski et al. | 384/537 |
| 5,490,732 A | * | 2/1996 | Hofmann et al. | 384/537 |
| 5,505,547 A | * | 4/1996 | Kodaira | 384/537 |
| 6,129,455 A | * | 10/2000 | Galante | 384/537 |
| 6,276,838 B1 | * | 8/2001 | Lauk et al. | 384/537 |
| 6,553,666 B2 | * | 4/2003 | Miyazaki | 29/894.362 |
| 2003/0103704 A1 | * | 6/2003 | Nieman et al. | 384/537 |

* cited by examiner

Primary Examiner—David M. Fenstermacher
(74) Attorney, Agent, or Firm—Michael D. Smith (57) ABSTRACT

A rack-and-pinion steering gear is provided. The gear comprises a lower shaft, a pinion gear, a first bearing, and a plurality of stakes. The lower shaft has a first end, a second end, and a shoulder depending radially outward from the lower shaft. The pinion gear is defined in a portion of the lower shaft proximate the first end. The first bearing has a first side, a second side, and an inner edge. The inner edge is disposed on the lower shaft such that the first side abuts the shoulder. The stakes have a first section that conforms to a radius defined at an intersection of the second side and the inner edge of the first bearing, and a second section resting against the second side of the first bearing.

14 Claims, 6 Drawing Sheets

STAKED RETENTION FOR PINION BALL BEARING

RELATED APPLICATION

This application claims the benefit of U.S. Provisional Application Ser. No. 60/383,550, filed May 28, 2002, the contents of which are incorporated by reference in their entirety herein.

BACKGROUND

This disclosure relates generally to the retention of ball bearings. More specifically, this disclosure relates to a staked retention for pinion ball bearings.

A steering system is required to control the direction of travel of a vehicle. Steering systems can include an articulated mechanical linkage or other mechanical connection between a hand wheel and steerable road wheels. The movement of the hand wheel causes a corresponding movement of the steerable road wheels, which controls the vehicle's direction of travel.

One example of such a steering system is a rack and pinion steering system. In such rack and pinion steering systems, a pinion gear is operatively connected to the hand wheel such that rotation of the hand wheel causes the pinion to rotate. The pinion gear is meshingly engaged with a rack gear, which is operatively connected to steerable road wheels by an articulated mechanical linkage. In this manner, the rotation of the hand wheel is translated into a linear movement of the rack, which steers the road wheels. The pinion gear can be rotatably supported with respect to the rack gear by one or more bearings.

There is a continuing desire for retention of the bearing on the pinion in a manner that requires less parts, less time, and mitigates bearing lash than has been possible with prior retention systems.

SUMMARY

A staked retention for a bearing of a rack and pinion steering system is provided. The bearing is retained through the cooperation of the staked retention with a shoulder, or the like, formed on the pinion shaft. The retention of the bearing can be further increased through an interference fit of the bearing with the pinion shaft. The bearing is typically pressed on the shaft along the axis of the shaft. The stake is also formed along the axis of the shaft. Thus, the stake can be formed simultaneous with the pressing of the bearing onto the shaft.

A rack-and-pinion steering gear is provided. The gear comprises a lower shaft, a pinion gear, a first bearing, and a plurality of stakes. The lower shaft has a first end, a second end, and a shoulder depending radially outward from the lower shaft. The pinion gear is defined in a portion of the lower shaft proximate the first end. The first bearing has a first side, a second side, and an inner edge. The inner edge is disposed on the lower shaft such that the first side abuts the shoulder. The stakes have a first section that conforms to a radius defined at an intersection of the second side and the inner edge of the first bearing, and a second section resting against the second side of the first bearing.

A method of retaining a bearing on a shaft is provided. The method comprises pressing the bearing on the shaft until a first side of the bearing contacts a shoulder defined on the shaft such that an interference fit is formed between an inner edge of the bearing and the shaft; and deforming a portion of the shaft into a second side of the bearing to form a stake, the interference fit and the stake cooperating to retain the bearing on the shaft.

A tool set for retaining a bearing on a shaft comprising a first tool and a second tool is provided. The first tool has a first end, a second end, and a first bore. The first bore has a dimension sufficient to receive a first end of the shaft therein. The first bore also has a plurality of flat sections each of which comprises a chamfer. The second tool also has a first end, a second end, and a second bore. The second bore has a dimension sufficient to receive the first tool therein, and has a dimension sufficient to receive a second end of the shaft therein. A lip is defined within the second bore for receiving a shoulder of the shaft thereon. Compression of the first and second tools causes the lip to act on the shoulder of the shaft and causes each flat section of the plurality of flat sections to act on a portion of the shaft such that the portion deforms and flows into the chamfers.

The above-described and other features are appreciated and understood by those skilled in the art from the following detailed description, drawings, and appended claims.

DETAILED DESCRIPTION

Figure 1:
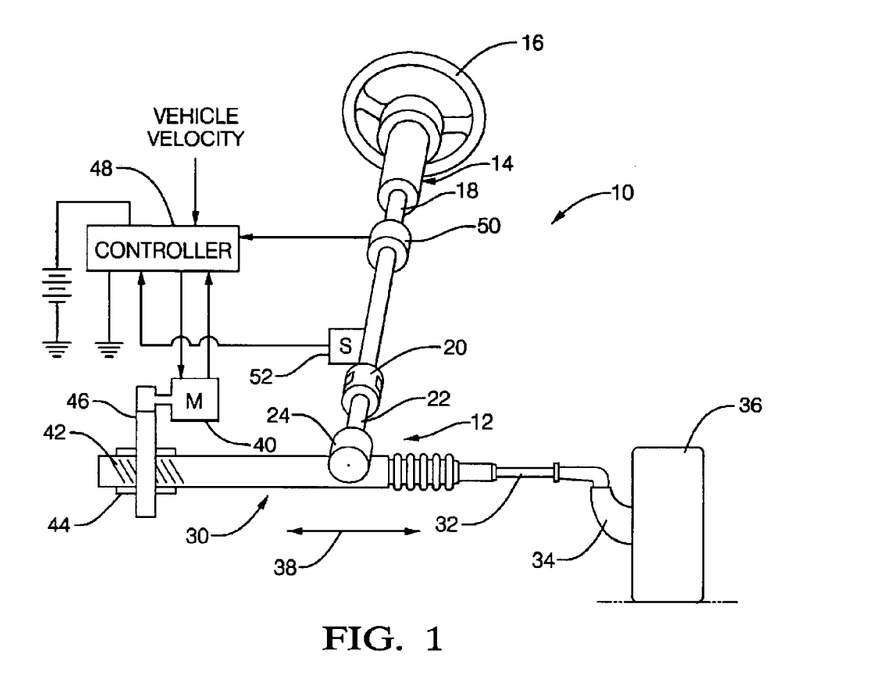
FIG. 1 is an illustration of a steering system for a vehicle.
Figure 2:
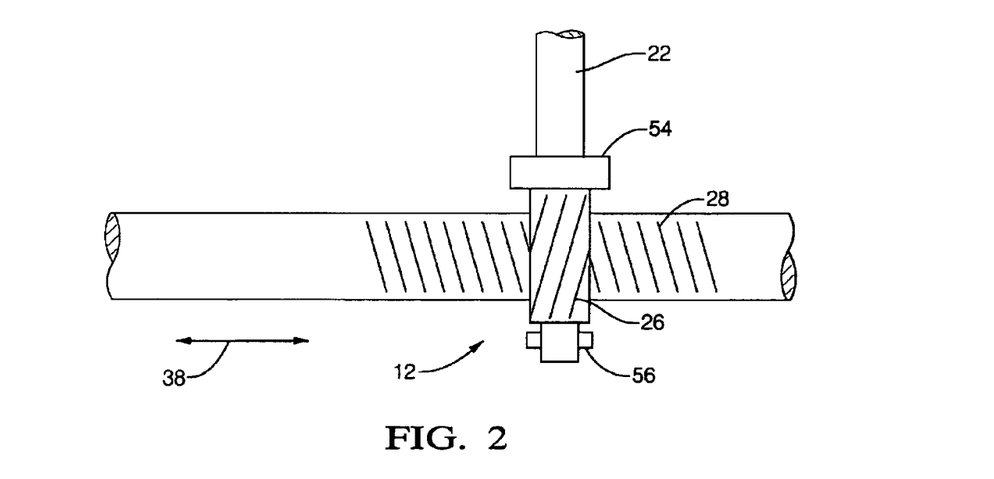
FIG. 2 is an illustration of a portion of the steering system in FIG. 1.
Figure 3:
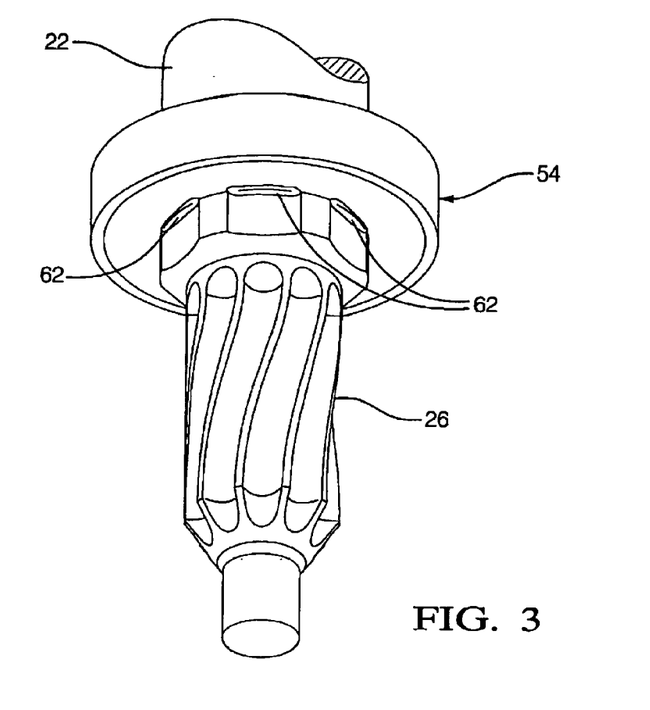
FIG. 3 is a perspective view of an exemplary embodiment of a bearing and pinion.
Figure 4:
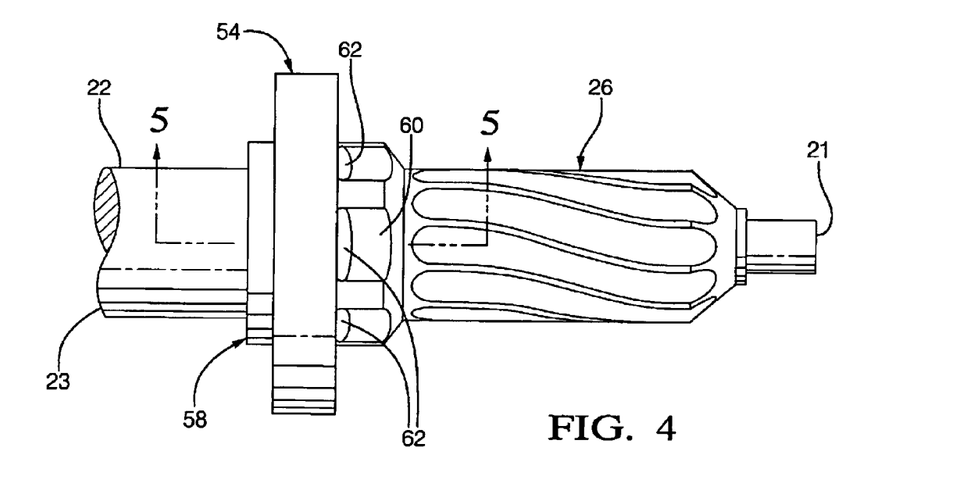
FIG. 4 is a side view of FIG. 3.

Referring now to FIGS. 1 and 2, a steering system 10 for use in a vehicle (not shown) is illustrated. Steering system 10 is provided with an assist system to reduce the effort necessary from the operator to steer the vehicle. By way of example only, steering system 10 is illustrated being assisted by an electric power steering (EPS) system. Steering system 10 allows the operator of the vehicle to control the direction of the vehicle through the manipulation of the steering system.

The steering system 10 comprises a rack-and-pinion gear set 12, a steering column 14, and a hand wheel 16. The hand wheel 16 is positioned so that an operator can apply a rotational force to the steering column 14. The steering column 14 comprises an upper shaft 18 secured to the hand wheel 16 at one end and a universal joint 20 at the other. The universal joint 20 couples the upper shaft 18 to a lower shaft 22.

The lower shaft 22 is secured to the universal joint 20 at one end and a gear housing 24 at the other. The gear housing 24 includes a pinion gear 26 (FIG. 2). The pinion gear 26 is positioned to make contact with a matching toothed portion 28 of a rack assembly 30. The pinion gear 26 has, for example, helical teeth that are meshingly engaged with straight-cut teeth of matching toothed portion 28. The pinion gear 26, in combination with the toothed portion 28, form the rack-and-pinion gear set 12.

The rack assembly 30 is coupled to the vehicle's steerable wheels with a steering linkage. For example, tie rods (only one shown) 32 are secured to rack assembly 30 at one end and knuckles 34 (only one shown) at the other. The knuckles 34 are operatively coupled with the steerable wheels 36 (only one shown).

As a rotational force is applied to steering column 14, through the manipulation of hand wheel 16 or other applied force, the pinion gear 26 is rotated. The movement of the pinion gear 26 intermeshed with the toothed portion 28 causes the movement of rack assembly 30 in the direction of arrows 38, which in turn manipulates tie rods 32 and knuckles 34 in order to reposition wheels 36 of the vehicle. Accordingly, when the hand wheel 16 is turned, rack-and-pinion gear set 12 converts the rotary motion of the hand wheel into the linear motion of rack assembly 30.

In order to assist the user-applied force to the steering system, an electric motor 40 is energized to provide power assist to the movement of the rack assembly 30, aiding in the steering of the vehicle by the operator. The motor 40 can be coupled to the rack assembly 30. By way of example only, the rack assembly can include a threaded portion 42, which engages a ball nut 44. The motor 40 can be configured to rotate a belt 46 engaged with the ball nut 44 to rotate the ball nut. The rotation of the ball nut 44 over the threaded portion 42 causes the rack assembly 30 to move laterally in the direction of arrows 38.

The electric motor 40 can be actuated by a controller 48 that receives inputs from one or more sensors to provide the desired level of steering assist. The sensors can include, for example, a torque sensor 50 and a rotational position sensor 52.

One or more bearings are positioned to rotatably support the pinion 26 in the housing 24. The bearings ensure that the helical teeth of the pinion 26 remain meshingly engaged with the straight-cut teeth of the toothed portion 28. In the illustrated embodiment, a first bearing 54 is secured to the lower shaft 22 above the pinion 26 and a second bearing 56 is secured to the lower shaft 22 below the pinion 26. Of course, other bearing arrangements are contemplated.

Referring now to FIGS. 3–6, an exemplary embodiment of a lower shaft 22 having a first bearing 54 secured thereto is illustrated. The lower shaft 22 comprises a first end 21 proximate the pinion 26 and a second end 23 remote from the pinion. A shoulder 58 is defined on the shaft 22 between the first and second ends.

The first bearing 54 is, for example, a ball bearing. The bearing 54 is pressed onto the lower shaft 22 over the first end 21 until one side of the bearing abuts against the shoulder 58. The bearing 54 is retained on the lower shaft 22 by an interference fit between the bearing and the shaft.

After or during the pressing of the bearing onto the shaft 22, a portion 60 of the lower shaft 22 is deformed to form a stake 62 against the side of the bearing opposite the shoulder 58. In this manner, the bearing 54 is held in place on the lower shaft 22 by a combination interference fit and staked retention.

Figure 5:
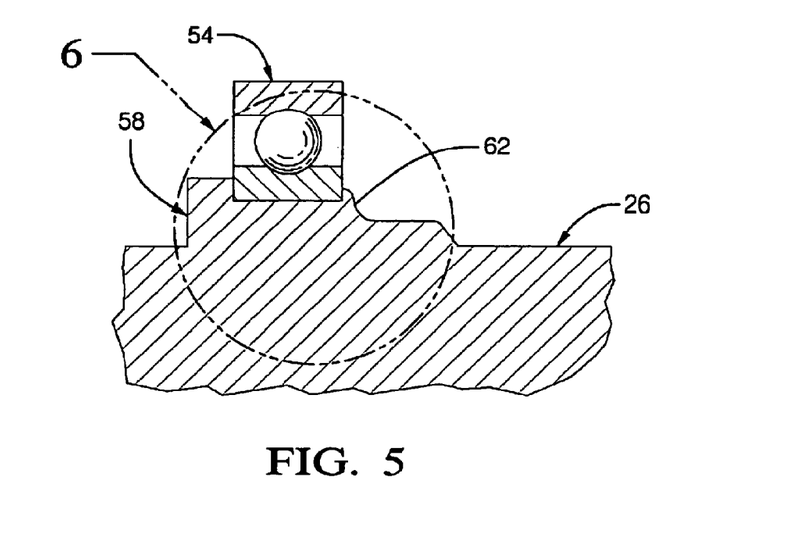
FIG. 5 is a sectional view taken along lines 5—5 of FIG. 4.
Figure 6:
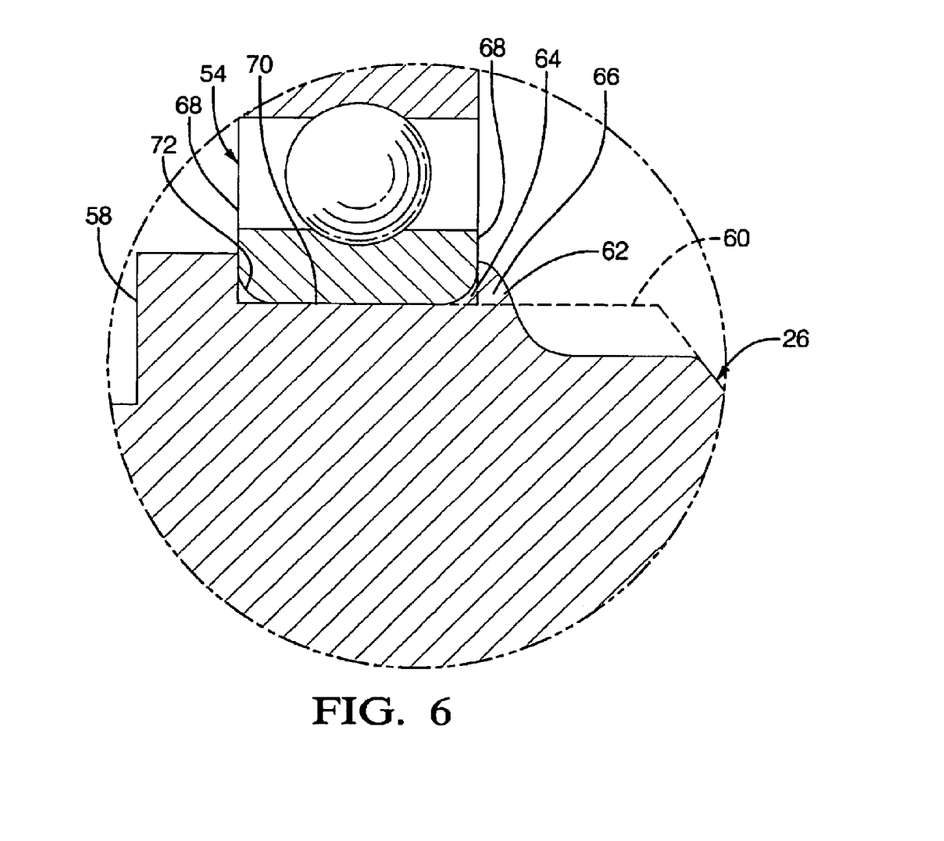
FIG. 6 is an enlarged view of circle 6 in FIG. 5.

The stake 62 comprises a first section 64 and a second section 66 and can have a shape that is for example, generally pyramidal or conical (e.g., a generally triangular cross section). By deforming the portion 60 of the shaft 22 into the side edge 68 of the bearing 54, the first section 64 of the stake conforms to the radius 72 that is often formed between the side edge 68 and the inner edge 70 of the bearing. The second section 66 of the stake rests against the side edge 68 of the bearing. Since the stake 62 conforms to the radius of the bearing and rests against the side edge of the bearing, the stake secures the bearing to the lower shaft in a manner that allows less bearing lash or movement than is possible with prior methods. Furthermore, since the stake 62 is in contact with and conformed to the radius 72 and side edge 68 of the bearing, the stake mitigates the occurrence of particulate matter or other contaminants from being introduced between the stake and the bearing. Thus, the stake 62 improves the axial retention of the bearing onto the shaft as compared to prior methods.

In a first exemplary embodiment, a plurality of stakes 62 are formed to hold the bearing 54 in place on the lower shaft 22. The stakes 62 can be evenly distributed about the circumference of the bearing. For example, it is contemplated for six stakes to be formed about 60 degrees away from one another. Of course, it should be recognized that any number of stakes sufficient to secure the bearing on the lower shaft can be used. Moreover, it is also contemplated that the stakes may or may not be evenly distributed about the circumference of the bearing.

The lower shaft 22 can be formed of any material suitable for the stress imparted on the pinion and the environment in which the pinion 26 functions. Further, the materials of the lower shaft 22 should be selected to allow for the formation of the stakes 62. For example, the lower shaft 22 can be formed of metallic materials such as non-hardened steel (e.g., 4150 steel), aluminum, and others.

The combination of the shoulder 58 and the stake 62 securing the bearing 54 on the lower shaft 22 also offers other improvements over prior methods. For example, by eliminating the need for a crimp ring, the lower shaft 22 no longer requires an undercut or groove to receive the ring. By eliminating the groove, the shaft is made stronger. Eliminating the ring also eliminates a part from the connection, which reduces the overall cost of the system.

Furthermore, due to the axial direction of staking, it is possible to combine the operation used to press the bearing onto the shaft with the formation of the stake 62. In effect, the stake can be formed inside the amount of time needed to press the bearing on the shaft. Thus, the overall time necessary to form the assembly can be decreased. In sum, the stakes 62 can be formed simultaneously with the pressing on of the bearing 54 or can be formed after the bearing has been pressed on.

In an alternate exemplary embodiment, the shoulder 58 can also comprise a radius (not shown) configured to conform to the radius between the side edge 68 and the inner edge 70 of the bearing. In this embodiment, both the stake 62 and the shoulder conform to the radius of the bearing and rests against the side edge of the bearing to further ensure that the bearing is secured to the lower shaft in a manner that allows less bearing lash or movement than is possible with prior methods.

Referring now to FIGS. 7–12, exemplary embodiments of a tool set comprising a first tool 74 (FIGS. 7–8) and a second tool 76 (FIGS. 9–10) are illustrated. The tools of the tool set are configured to work together to form the stakes 62 described above (FIGS. 11–12). In addition, the tool set can be configured to press the bearing 54 onto the lower shaft 22 during the formation of the stakes 62.

Figure 7:
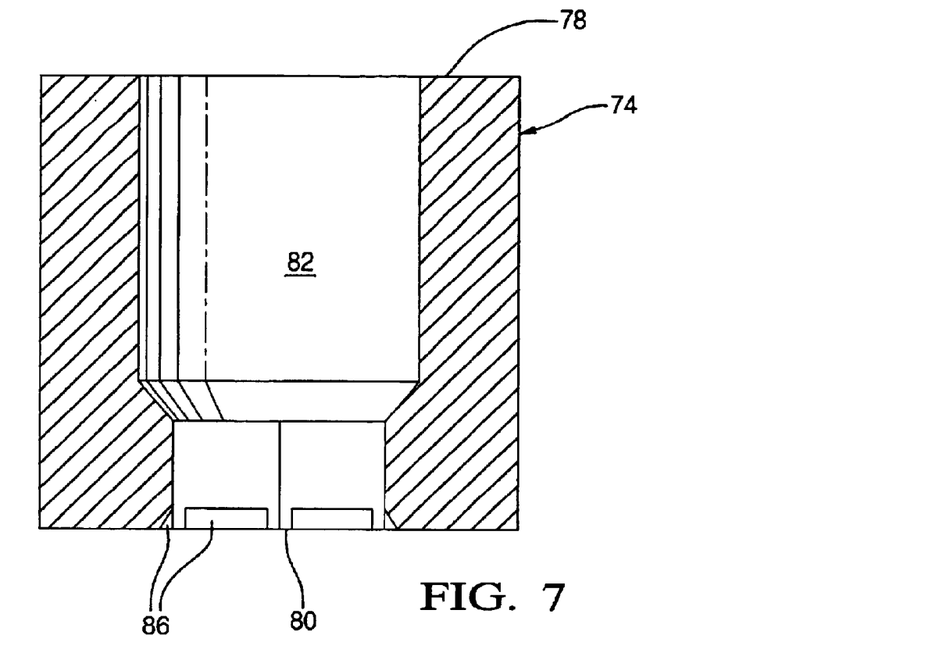
FIG. 7 is a sectional view of an exemplary embodiment of a first tool.
Figure 8:
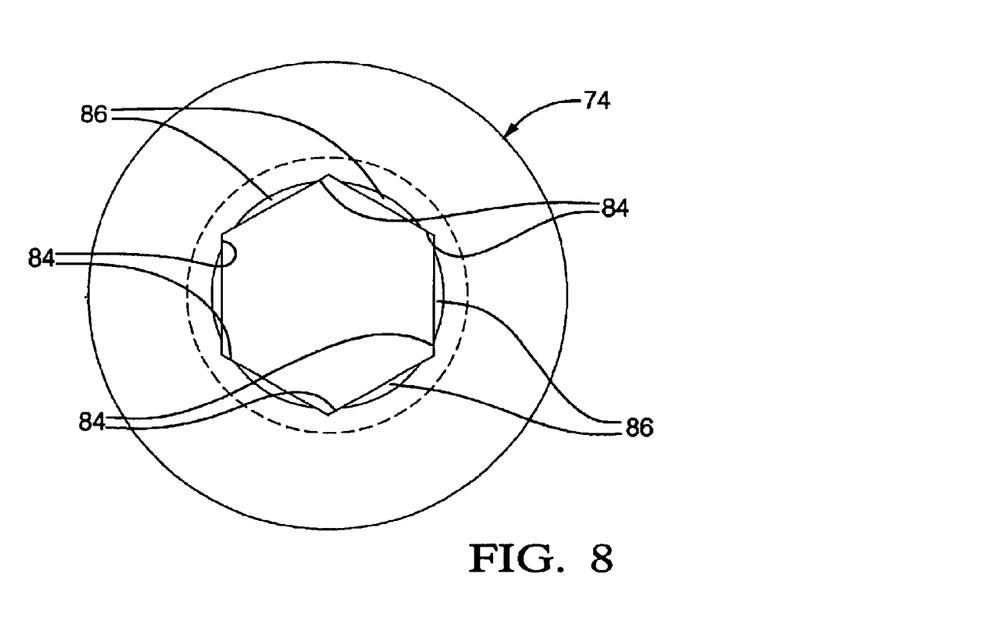
FIG. 8 is bottom view of the first tool of FIG. 7.

The first tool 74 has a first end 78, a second end 80, and a bore 82 defined therethrough between the first and second ends. The bore 82 has a dimension sufficient to receive the first end 21 of the lower shaft 22 therein. The bore 82 at least at the second end 80 has a plurality of flat sections 84 formed thereon. In an exemplary embodiment, the second end 80 comprises six flat sections 84. The flat sections 84 can have a radius formed at the intersection of each adjacent section.

Each flat section 84 comprises a chamfer 86. Thus, the exemplary embodiment of the first tool comprises six flat sections 84 and six chamfers 86. The chamfers 86 have a generally pyramidal or conical shape. As will be described in more detail herein, the flat sections and chamfers are configured to form the stakes 62.

The chamfers 86 can be provided in the first tool 74 in a manner that minimizes the time needed to make the tool. For example, the first tool 74 can be made by initially boring the second end 80 to a desired dimension, where the desired dimension is substantially equal to the minor dimension of the final hexagonal shape. Next, the edge between this initial bore and the second end 80 is chamfered. Finally, the initial bore is re-worked to provide the hexagonal shape. Several advantages can be provided by chamfering the edge before forming the hexagonal shape. First, if the chamfers 86 are machined after the hexagonal shape is applied, then each chamfer will need to be machined separately. In contrast, by providing the chamfer before the hexagonal shape, all of the chamfers are provided in a single step, which greatly reduces the time needed to make the tool. Second, by chamfering the edge before machining the hexagonal shape, the chamfers 86 can easily be provided with the desired conical shape.

It should be recognized that the first tool is described above as having a hexagonal shape comprising six flat sections and six chamfers. Of course, more or less than six flat sections are contemplated. Similarly, more or less than six chamfers are contemplated. In addition, it is also contemplated for some or all of the flat sections to having none, one, or more than one chamfer. The number of chamfers and flat sections should correspond to the desired number and orientation of the stakes.

Figure 9:
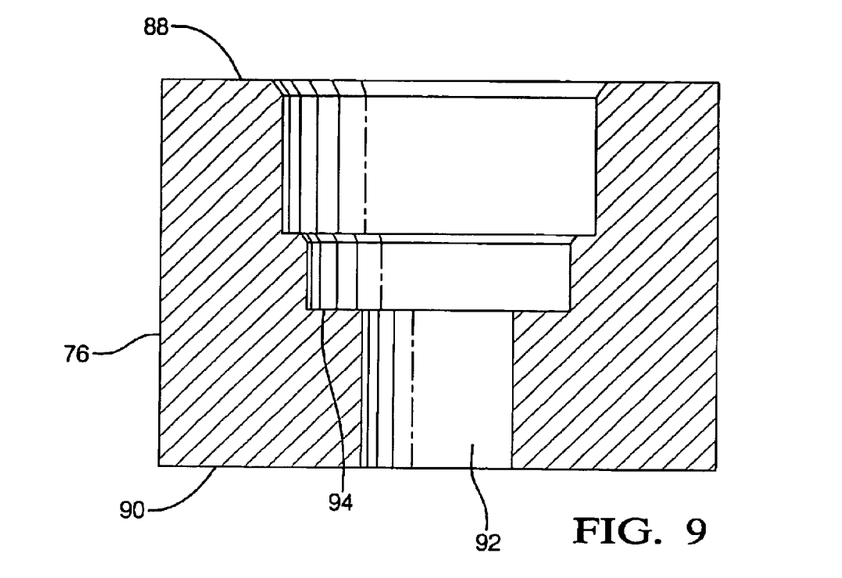
FIG. 9 is a sectional view of an exemplary embodiment of a second tool.
Figure 10:
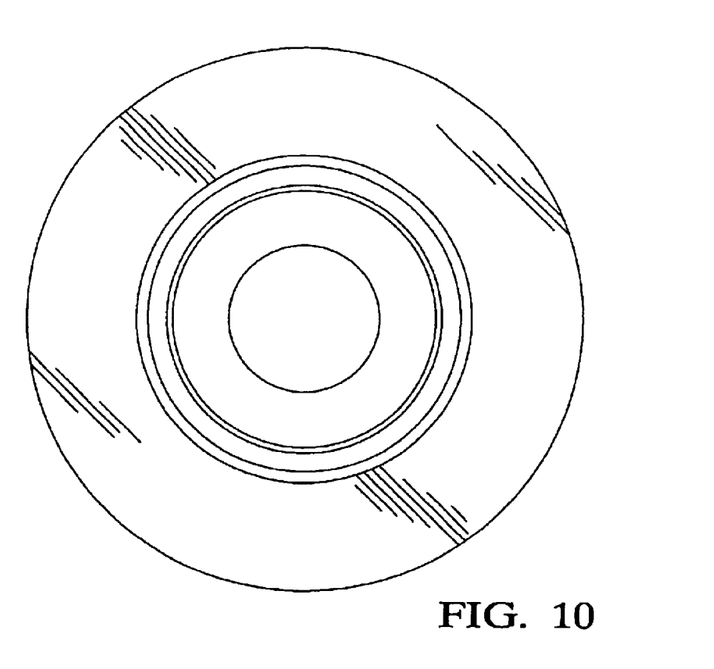
FIG. 10 is top view of the second tool of FIG. 9.

The second tool 76 also has a first end 88, a second end 90, and a bore 92 defined therethrough between the first and second ends. The bore 92 at the first end 88 of the tool 76 has a dimension sufficient to receive the second end 80 of the first tool 74 therein. The bore 92 at the second end 90 of the tool 76 has a dimension sufficient to receive the second end 23 of the lower shaft 22 therein. The second tool 76 further comprises a lip 94 within the bore 92. The lip 94 is configured to receive the shoulder 58 of the lower shaft 22 thereon.

The first and second tools 74 and 76 can be formed of any material suitable for the stress imparted during the formation of the stakes 62. For example, the first and second tools 74 and 76 can be formed of hardened materials, such as hardened tool steel.

Figure 11:
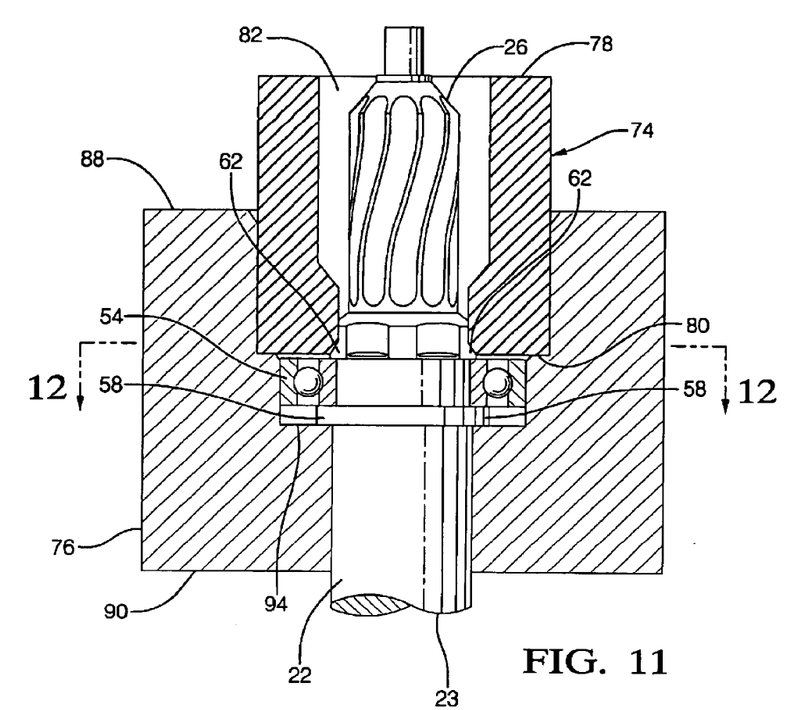
FIG. 11 is a sectional view of the tools of FIGS. 7–10 staking a bearing on a lower shaft.
Figure 12:
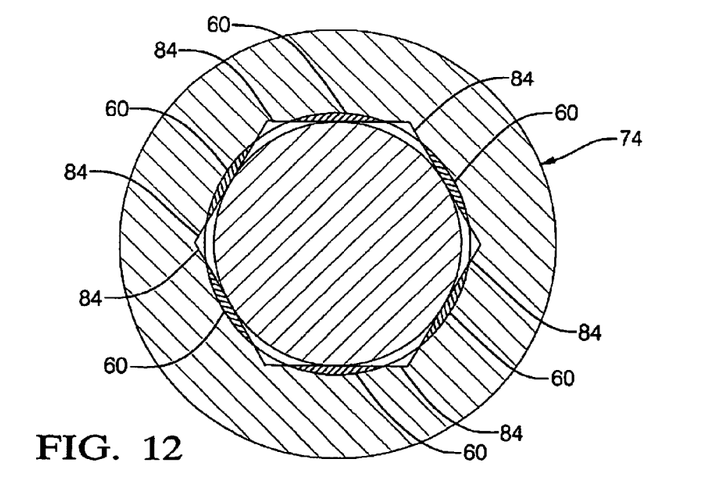
FIG. 12 is a sectional view taken along lines 12—12 in FIG. 11.

Turning now to FIGS. 11–12, the first and second tools 74 and 76 are illustrated during the formation of the stakes 62. In exemplary embodiments, the bearing 54 can be pressed on by the tools during (e.g., simultaneous to) the formation of the stakes 62, or can be pressed on in a separate pressing operation before the formation of the stakes.

The bore 92 of the second tool 76 is placed over the second end 23 of the lower shaft 22 until the lip 94 of the tool rests on the shoulder 58 of the shaft. The first tool 74 is inserted into the bore 92 at the first end 88 of the second tool 76. At this point, the bore 82 of the first tool 74 receives the first end 21 of the lower shaft 22. The first and second tools are pressed together such that the flat sections 84 defined at the second end 80 of the first tool 74 act on the portions 60 of the lower shaft 22 and such that the lip 94 of the second tool 76 acts on the shoulder 58 of the lower shaft. In effect, the portion 60 of the lower shaft 22 is compressed between the first and second tools.

The flat sections 84 act on the portion 60 of the lower shaft 22 to deform the portion. The deformed portion 60 flows into the chamfers 86 and forms the stakes. Namely, the material of the shaft 22 at portion 60 is deformed beyond its plastic region and is displaced into the chamfers 86 by the compression of the portion by the flat sections 84. This creates a robust stake 62, which improves the retention stiffness of the stake. The retention stiffness of the stake 62 is the ability of the stake to withstand axial loads that can be applied to the bearing 54 during use.

The configuration of stakes 62 does not require shearing of the lower shaft (e.g., scissor or edge type shearing). In such scissor or edge type shearing, an edge of a tool would be used to shear or cut a portion of the shaft to form the stake. In such shear staking operations, the working edge of the tool can quickly be come dull and can require replacement or reworking of the tool. In contrast, the first and second tools use the flat sections 84, and not a point or edge of the tool, to deform the portion 60 of the shaft 22. Therefore, the life of the tool set is increased over shear type staking by reducing tool wear.

It should be recognized that the stakes 62 are described above by way of example only as finding use with an EPS steering system. Of course, the stakes can be used with manual or non-assisted steering systems, and with hydraulically assisted steering systems. Moreover, the stakes can find use any time a ball bearing, which is press fit onto a shaft requires additional axial retention means.

It should also be noted that the terms "first", "second", "third", "upper" and "lower", and the like may be used herein to modify elements performing similar and/or analogous functions. These modifiers do not imply a spatial, sequential, or hierarchical order to the modified elements unless specifically stated.

While the invention has been described with reference to one or more an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rack-and-pinion steering gear, comprising:
   a lower shaft having a first end, a second end, and a shoulder depending radially outward from said lower shaft at a point between said first and second ends;
   a pinion gear defined in a portion of said lower shaft proximate said first end;
   a first bearing having a first side, a second side, and an inner edge, said inner edge being disposed on said lower shaft such that said first side abuts said shoulder and
   a plurality of stakes being formed of deformed portions of said lower shaft, said deformed portions of said lower shaft being formed by staking in an axial direction relative to said lower shaft, said stakes having a first section and a second section, said first section conforming to a radius defined at an intersection of said second side and said inner edge of said first bearing, and said second section resting against said second side of said first bearing.

2. The rack-and-pinion steering gear as in claim 1, further comprising an interference fit defined between said inner edge of said first bearing and said lower shaft for retaining said first bearing on said lower shaft.

3. The rack-and-pinion steering gear as in claim 2, wherein said first section of said plurality of stakes ensure that said first bearing is secured to said lower shaft in a maimer that mitigates lash or movement of said first bearing between said shoulder and said plurality of stakes.

4. The rack-and-pinion steering gear as in claim 3, wherein said plurality of stakes are evenly distributed about a circumference of said lower shaft.

5. The rack-and-pinion steering gear as in claim 1, wherein said plurality of stakes comprises six stakes.

6. The rank-and-pinion steering gear as in claim 5, wherein said six stakes are evenly distributed about a circumference of said lower shaft.

7. The rack-and-pinion steering gear as in claim 1, wherein said plurality of stakes have a generally pyramidal or conical shape.

8. The rack-and-pinion steering gear as in claim 1, wherein the rack-and-pinion steering gear is an electric power steering system, hydraulic steering system, or a manual steering system.

9. The rack-and-pinion steering gear as in claim 1, wherein said first bearing is pressed onto said lower shaft with formation of said plurality of stakes.

10. The rack-and-pinion steering gear as in claim 1, wherein said staking provides a combination interference fit and staked retention of said first beating.

11. The rack-and-pinion steering gear as in claim 1, wherein said plurality of stakes are formed with a working edge of a tool having corresponding flat sections eliminating a need to replace or rework at least one of an edge and a cutting surface of the tool.

12. The rack-and-pinion steering gear as in claim 11, wherein the corresponding flat sections are biased in an axial direction of said lower shaft to deform a portion of said lower shaft forming said plurality of stakes.

13. The rack-and-pinion steering gear as in claim 1, wherein said deformed portions of said lower shaft being formed by staking in said axial direction relative to said lower shaft initiate at an exposed second shoulder of said lower shaft extending from said first bearing opposite said first shoulder.

14. The rack-and-pinion steering gear as in claim 13, wherein said exposed second shoulder defines a stepped portion of said lower shaft having a diameter corresponding with said inner edge of said first bearing.

* * * * *